United States Patent [19]

Zbinden

[11] Patent Number: 5,093,587
[45] Date of Patent: Mar. 3, 1992

[54] ECL BIDIRECTIONAL BUS FOR USE IN A NETWORK WITH MODULES WHICH EMPLOYS HIGH RESISTANCE INTERCONNECT TECHNOLOGY BETWEEN MODULE

[75] Inventor: Terry B. Zbinden, Maple Grove, Minn.

[73] Assignee: Unisys Corporation, Blue Bell, Pa.

[21] Appl. No.: 598,274

[22] Filed: Oct. 16, 1990

[51] Int. Cl.$^5$ .................. H03K 19/092; H03K 17/56
[52] U.S. Cl. .................. 307/475; 307/443; 307/455; 307/246
[58] Field of Search .............. 307/443, 475, 270, 455, 307/246

[56] References Cited

U.S. PATENT DOCUMENTS

| | | | |
|---|---|---|---|
| 4,236,087 | 11/1980 | Kaminski et al. | 307/475 |
| 4,347,446 | 8/1982 | Price | 307/455 |
| 4,577,125 | 3/1986 | Allen | 307/455 |
| 4,874,970 | 10/1989 | Coy et al. | 307/455 |

Primary Examiner—Edward P. Westin
Assistant Examiner—Richard Roseen
Attorney, Agent, or Firm—Glenn W. Bowen; Mark T. Starr

[57] ABSTRACT

ECL bus driver circuits for multi-driver net use are provided with a disable transistor that has its emitter coupled to the emitter of the pull-down transistor of the driver so that when the disable circuit of a driver is activated, the coupled pull-down transistor is not able to sustain current flow through its collector-emitter path, and when the disable transistor is turned off, the pull-down transistor enables the drive circuit to function in its normal manner.

2 Claims, 5 Drawing Sheets

ECL BIDIRECTIONAL BUS FOR USE IN A NETWORK WITH MODULES WHICH EMPLOYS HIGH RESISTANCE INTERCONNECT TECHNOLOGY BETWEEN MODULE

BACKGROUND OF THE INVENTION

1. Field of the Invention

This invention is related to high speed digital signal transmission buses, or nets, and more specifically to the transmission of digital signals from multiple sources that are implemented in emitter-coupled-logic (ECL) that employs multi-chip modules with thin film interconnect.

2. Description of Background Art

For many years standard techniques for driving high-speed signals in digital computers have been employed. One standard approach is to match the impedance of the transmission line to the driver's ability to drive output current and the system's ability to carry this current and dissipate the power. For emitter-coupled logic (ECL) the standard impedance is 50 to 75 ohms. This value is chosen to allow the driver to be of a reasonable physical size, and the effect of loading capacitance on the transmission line to be minimized. For example, driving a 50 ohms impedance with a 0.8 volt swing from low to high or high to low causes a change in current of about 16 milliamperes. If this current change is not absorbed by a termination resistor at the end of the net, or otherwise clamped off or dissipated, it will reflect back toward the driver as an unwanted signal of increased magnitude.

Standard practice in printed circuit boards, back-panels, cables and similar transmission media to avoid this problem is to place a resistor at the end of the wire whose value equals the impedance of the transmission line. This is called end termination, or parallel termination. Such termination works satisfactorily for wires with controlled impedance and with a low value of resistance in series between the driver and the termination resistance. Any other resistance in series either due to high resistance metal, or other added resistance will cause a voltage divider to exist between the driver and the receiver which is very undesirable with ECL since the allowable drop in voltage is only about 135 millivolts before the receiver is unable to determine if a proper signal has arrived.

BRIEF DESCRIPTION OF THE DRAWINGS

The present invention is illustrated by reference to the drawings in which.

FURTHER DESCRIPTION OF BACKGROUND ART

Figure 1:
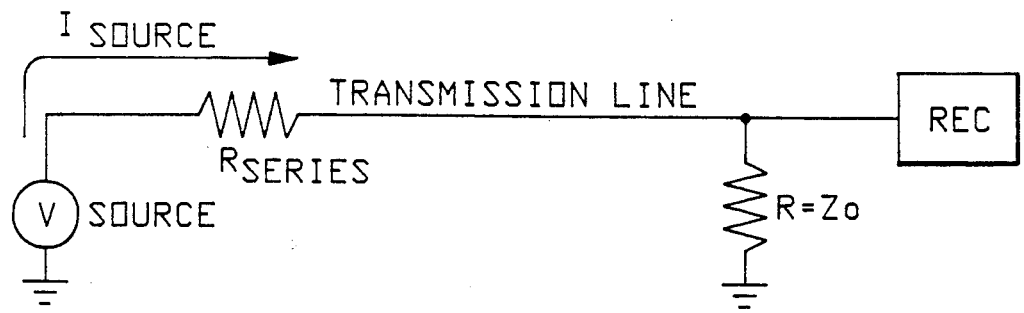
FIG. 1 shows a prior art block diagram transmission line that is terminated in its characteristic impedance, $Z_0$, with a resistance having a value equal to $Z_0$ connected at the receiving end.

FIG. 1 illustrates a prior art termination of a transmission line with a resistor equal to the characteristic impedance of the line. The voltage at the receiver is determined by voltage division between the series resistance R(series) and the termination resistance R(term). The relationship of the output voltage V(out) to the voltage source V(source) is then determined from the following formula where x indicates multiplication and + indicates addition.

$$V(\text{out}) = \frac{1 \times 50}{50 + (10 \text{ cm} \times 4)} = \frac{50}{90} = 0.555 \text{ volts}$$

For a series resistance of 5 ohms, a termination resistance of 50 ohms and source of 1 volt, the signal at the receiver is 0.909 volts, or 91 millivolts have been lost due to the series resistance, which is reasonable for circuits with a typical tolerance level in the range of 135 millivolts, for example.

Thin film interconnect technology is desirably employed in modules that contain multiple unpackaged dies to reduce the size of the modules with the interconnect metal not as large in cross-section as in circuit boards with larger packaged dies. The resistance of such interconnects tends to be quite large. For example, it may preferably have values ranging from 0.4 ohms per centimeter to more than 4 ohms per centimeter of length, compared to the resistance of copper in standard printed circuit boards which is about 0.04 ohm per centimeter. This high series resistance in the range of one to two orders of magnitude larger than the resistance of copper interconnect lines in conventional printed circuit boards is not desirable but is required for the module in order to keep the line-to-line spacing and the number of layers small for manufacturability. If the length of the interconnect line is 10 centimeters, which is not unreasonable for a 5×5 array of chips, then (if $V_{in} = 21.0$ volts):

$$V(\text{out}) = \frac{V(\text{source}) \times R(\text{term})}{R(\text{series}) + R(\text{term})}$$

which is not a reasonable value for a circuit which allows 135 millivolts of noise margin.

Figure 2:
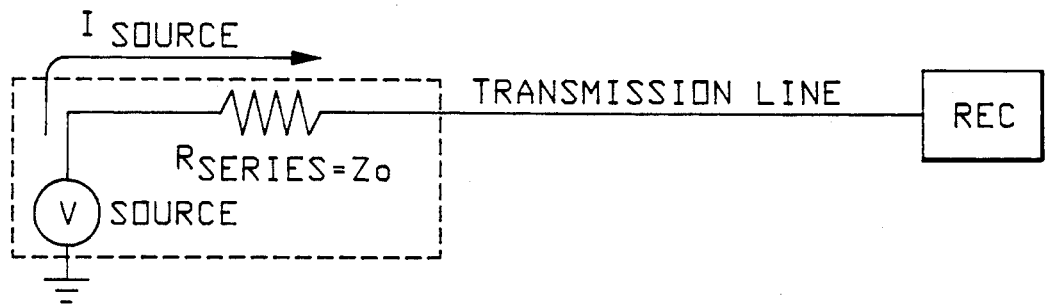
FIG. 2 shows a prior art block diagram series terminated transmission line where the matching resistance is made part of the signal driver.
Figure 3:
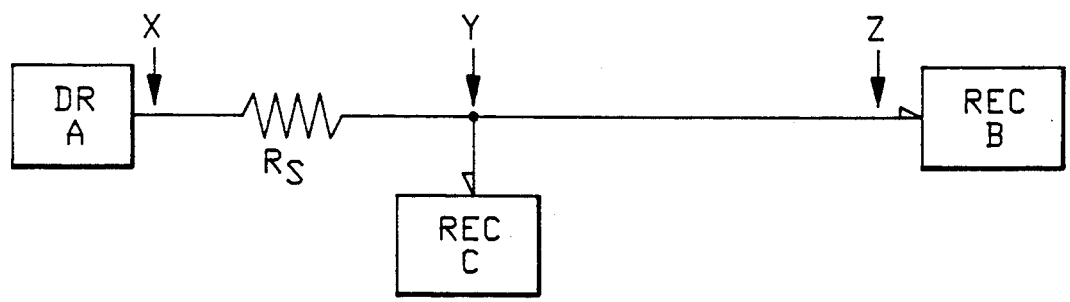
FIG. 3 illustrates a block diagram of a prior art type of receiver network that employs the series terminated transmission line technique of FIG. 2.
Figure 4:
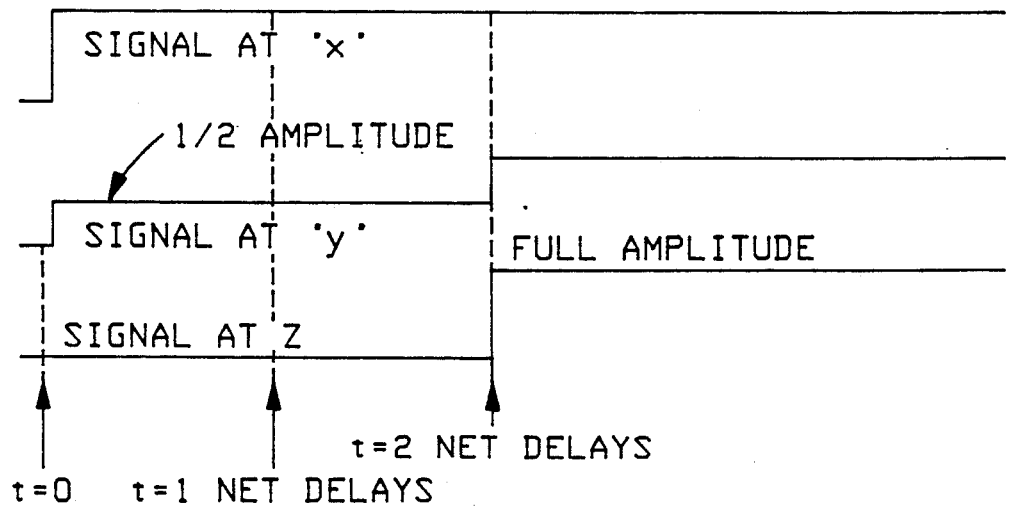
FIG. 4 is a timing diagram for the network of FIG. 3.

One solution to this problem, as shown in FIG. 2, is to use series terminated lines where the matching resistor is made part of the driver, and the line signal starts out half as large, doubles at the open end and is terminated at the driver. This design works very well and is applicable to lines with either high or low resistance, since there is no DC current in the line to cause a voltage drop at the receiver. This same approach is a generally accepted method of driving TTL and CMOS-type circuits. It has one major drawback for multi-receiver nets, as shown in FIGS. 3 and 4, where a driver A and receivers B and C are illustrated. Since the signal along the net is about ½ amplitude until it doubles at the end of the net (point Z) receivers, (such as receiver C), intermediate the ends (at point Y, for example) will have a long wait until a final signal level is achieved. This delay can be up to 2 times the delay of the net itself (i.e., the time for a signal at X to travel to Z), as illustrated by the timing diagram of FIG. 4.

Figure 5:
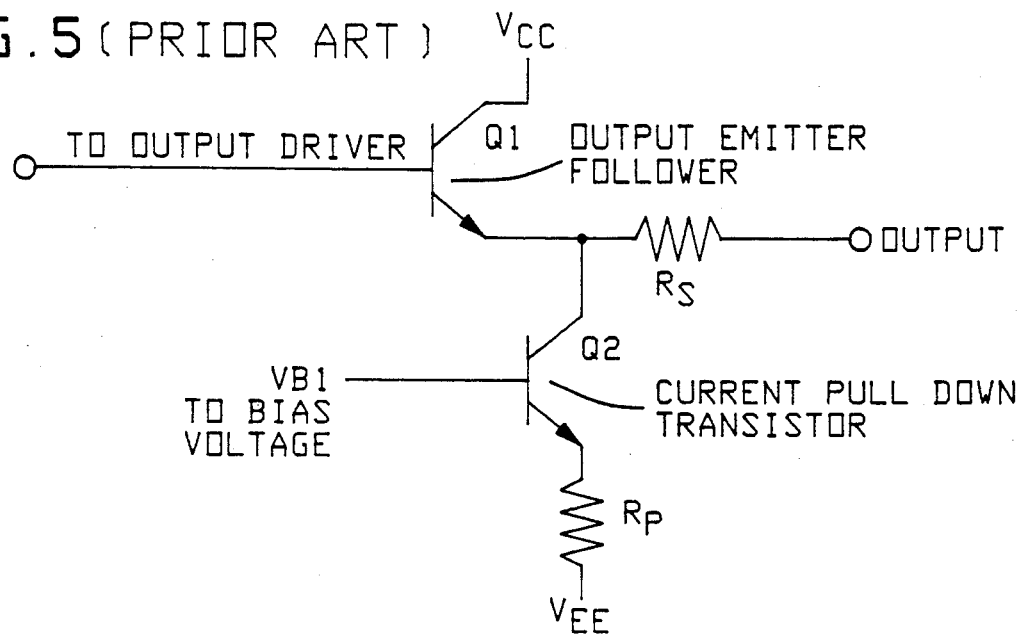
FIG. 5 represents a schematic of a typical prior art ECL driver circuit.

A typical driver circuit for ECL applications is shown in FIG. 5, which illustrates an NPN transistor implementation. Transistor $Q_1$ is an output emitter-follower transistor and $Q_2$ is a current pull-down transistor. The emitter of $Q_1$ is connected to $R_S$ which represents the series output resistance. The collector of $Q_1$ is connected to a ground $V_{CC}$, and the base is connected to an output driver (not shown) to receive a drive signal. Transistor $Q_2$ is connected through resistor $R_p$ to a negative supply voltage $V_{EE}$ and the collector $Q_2$ is connected to the emitter of $Q_1$. The base of $Q_2$ is connected to $V_{B1}$, a bias voltage. The function of $Q_2$ is to pull down the emitter of $Q_1$ to a low level (more negative) when the signal from the output driver goes to a low level.

Such a driver not only must be able to supply the current necessary to pull the signal net to a high (or nominally a "1") state, it must also be able to pull it down to the low (or nominally a "0") state. With TTL and CMOS logic, this is inherent in the push-pull nature of the driver, but in ECL it is not. This problem has been solved by the addition of a pull-down transistor current source, which provides the necessary sink current when the net signal goes to the low state. The series resistor $R_S$ in the circuit of FIG. 4 may be chosen to match the impedance of the load being driven, which in a typical net would be 50 ohms minus the output resistance of the driver. If the resistance of the net driven by such a driver were itself high, then the value of the series resistor at the driver could be reduced by that amount up to the point where there would be no resistance at the driver. This kind of high resistance net, called "self terminating resistance" is found in thin film multi-chip modules.

Figure 6:
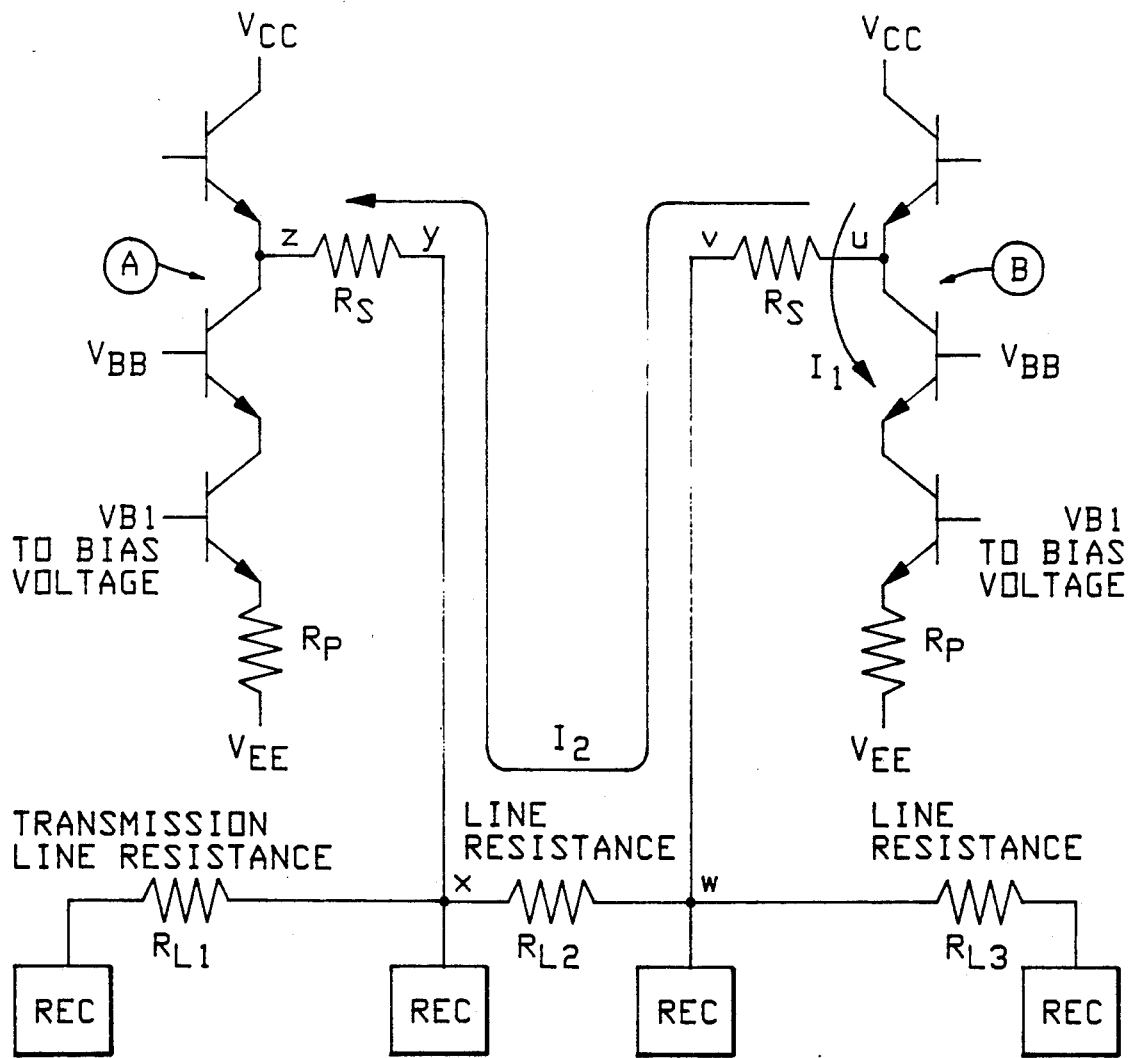
FIG. 6 is a schematic of a multiple driver/multiple receiver network that could be constructed using the prior art circuit of FIG. 5, and, for this reason, it also is labelled "PRIOR ART"

When a net needs to have more than one driver on it, as in the case of a bus, a problem exists if ECL logic is to be used for the driver because a DC steady-state current will exist between a driver having a high output and the other drivers on the net. In the case of TTL or CMOS, there is no steady-state current source as there is in ECL, so the problem does not exist for these logic types. However, with ECL, if the current-pull-down circuit previously described were utilized, it would draw current all of the time. When the net resistance is low, as on a printed circuit board, this would not be a problem, and the net would perform just as it would for the end terminated situation described in FIG. 1. If a high resistance net, however, were driven with the ECL driver of FIG. 5, a circuit line that is shown in FIG. 6 could be implemented, and for this reason FIG. 6 is labelled as "PRIOR ART", but it is not known if the illustrated circuit was ever actually used as a driver in a high resistance net because of the problems the circuit presents. FIG. 6 illustrates the current $I_1$ and $I_2$ that would flow in such a system if conventional ECL driver circuit B was turned on (high or logical "1" state) and the driver circuit A was turned off (low or logical "0" state), where circuits A and B are implemented in accordance with the circuit of FIG. 5. In FIG. 6 nodes U, V, W are shown which are associated with driver B and are analogous to nodes Z, Y, X associated with driver A.

In this case, the steady state voltage seen by the receivers between the two drivers, at each of the driver nodes X and W is insufficient to be detected as a logical high or "1" state. The net has series line resistances $R_{L1}$, $R_{L2}$ and $R_{L3}$ between receivers. This loss is due to the flow of DC current between driver A and driver B multiplied through the series line resistance $R_{L2}$ and resistances $R_S$ between the nodes Y, Z and U, V. For example, if $R_S$ were 4 ohms per cm and the length were 10 cm, the loss would be approximately 0.36 volts, which is unacceptable. For this reason, multi-driver nets have not previously been used with success with modules that utilize thin film interconnect technology and ECL logic.

Figure 7:
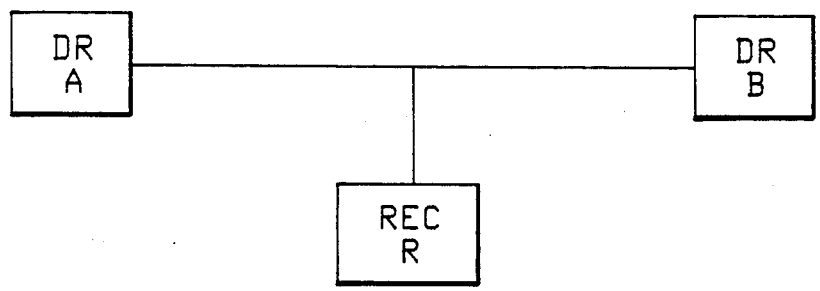
FIG. 7 is a block diagram of a simplified generic block diagram of a network with a driver at both ends and a receiver in the middle.
Figure 8:
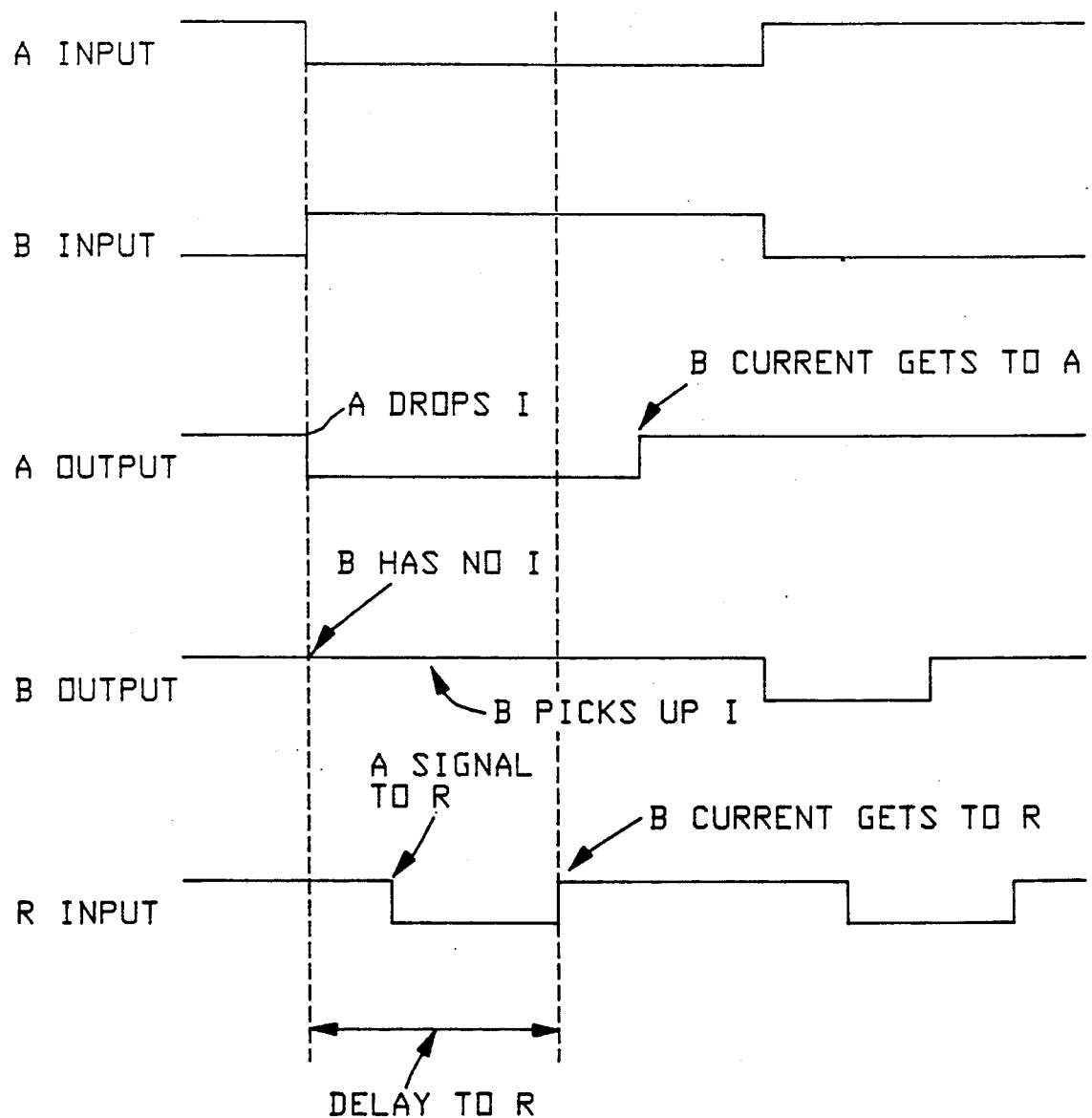
FIG. 8 is a timing diagram that shows the operation of the network of FIG. 7 when the circuit of FIG. 5 is used to implement it, and for this reason it is also labelled "PRIOR ART"

A generic representation of a net having drivers A and B and one receiver, R, intermediate the drivers is shown in FIG. 7, and FIG. 8 illustrates the way signals in such a net would occur. As shown in FIG. 8, it is assumed the A driver input drops and the B driver input rises at the same time. The A output immediately drops, but the B output remains high, as does the R input. The R input is first affected by the drop of the A output and drops when the A signal reaches R. The B output signal current next gets to R and the R input then goes high. The "delay to R" indicated in the Figure is the time from the drop of the A input signal to a low level to the time the B current reaches R. The next thing that happens is the B current gets to A and the A output rises. Operation of the prior art net illustrated in FIG. 7 requires that the transmission of signals between drivers A and B occur before the signal settles for final state because of the initial current flow between the drivers which results in an unacceptable delay.

SUMMARY OF THE INVENTION

An emitter-coupled-logic bidirectional bus is implemented by coupling an enabling transistor to the pull-down transistor of each of the drivers that are coupled to the bus, or net, so that only one of the pull-down transistors is enabled at any time, which eliminates the flow of D.C. currents between the active driver circuit and the inactive driver circuit, and which also eliminates the signal loss at the receivers that are coupled to the bus, which would otherwise occur due to D.C. current flow.

DESCRIPTION OF A PREFERRED EMBODIMENT OF THE PRESENT INVENTION

Figure 9:
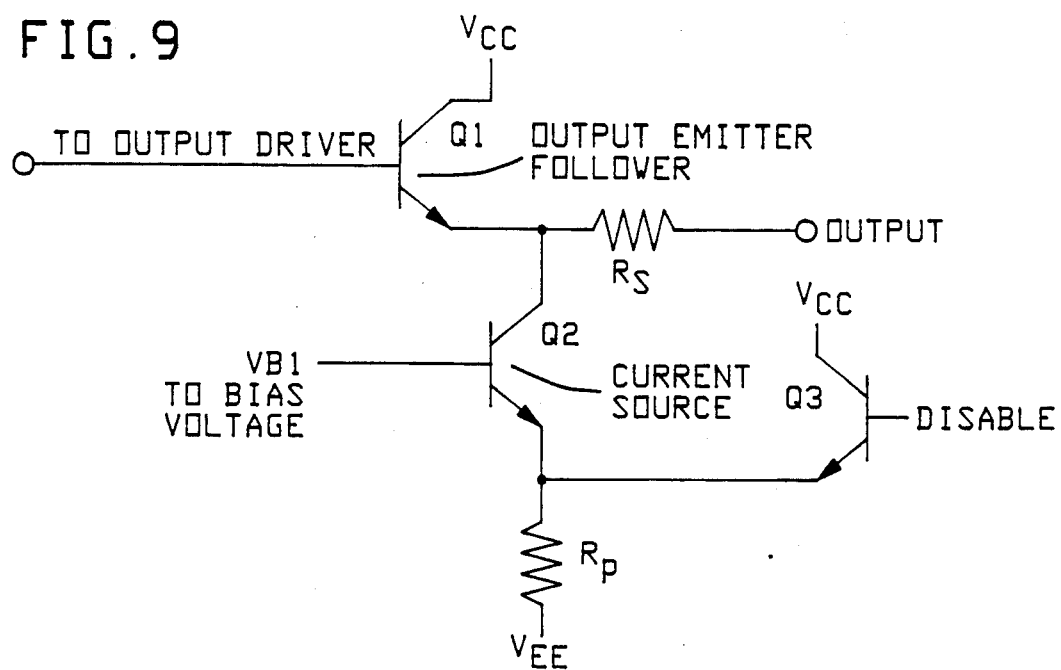
FIG. 9 shows a schematic of the ECL driver circuit that is used in the present invention.

A modified ECL driver circuit which is used to implement the present invention is shown in FIG. 9. It consists of the ECL driver circuit of FIG. 5 with transistor $Q_3$ added to provide a selective disable function for enabling only one driver circuit of a net at a time. The emitter of $Q_3$ is coupled to $V_{CC}$ (ground), and the emitter is coupled to the emitter of transistor $Q_2$. The base of $Q_3$ is coupled to a disable signal which is applied by a signal driving circuit (not shown) to the selected driver. This disable signal and a drive signal from the output driver (not shown) that is supplied to the base to the transistor $Q_1$ simultaneously go to levels such that the transistor $Q_3$ shuts off, and the pull-down transistor $Q_2$ turns on. When the enable transistor $Q_1$ is turned on by the application of the disable signal to the base of the transistor $Q_3$, the pull-down transistor cannot sustain enough current flow through its pull-down resistor $R_p$ and $Q_2$ is essentially cut off to cause a significant drop in the current drawn from the net, thereby reducing the unwanted signal loss at the loads to essentially zero.

Figure 10:
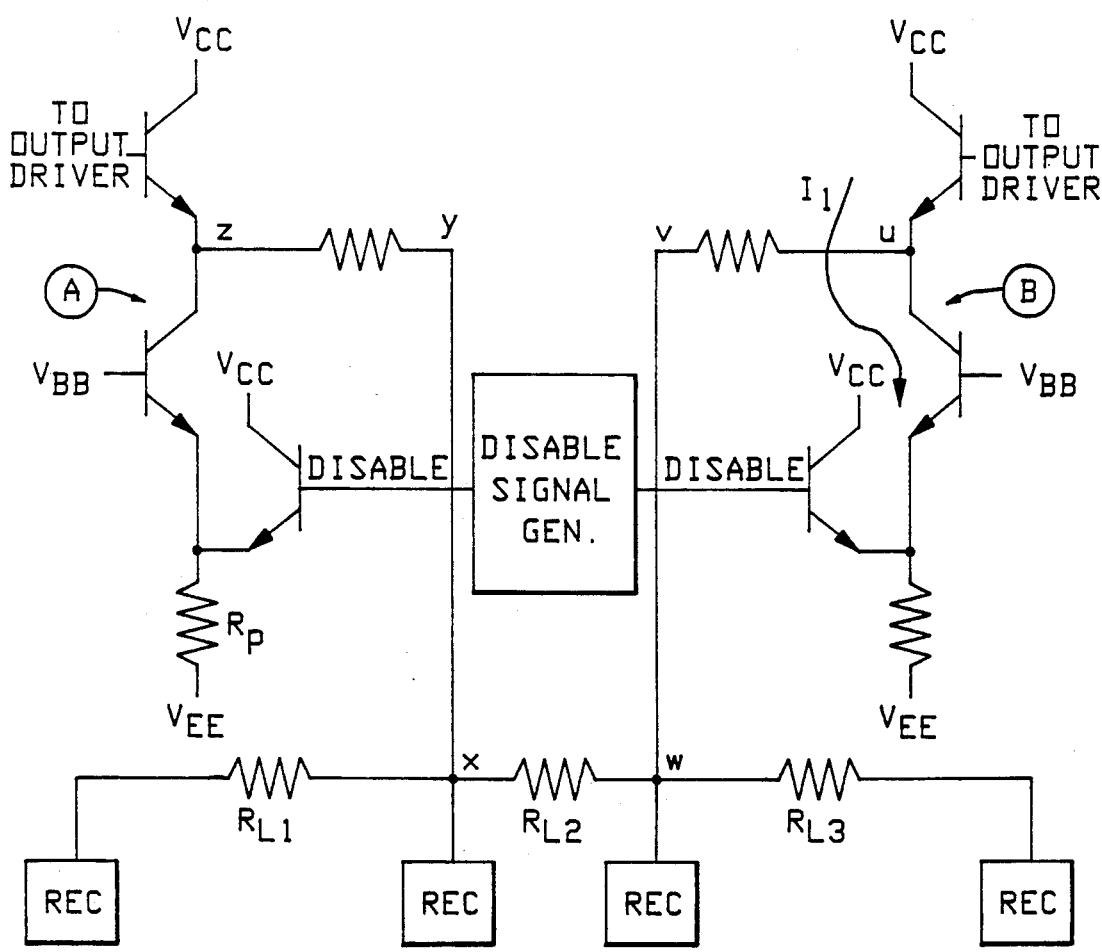
FIG. 10 is a schematic of the multiple bus driver/multiple receiver network of the present invention.
Figure 11:
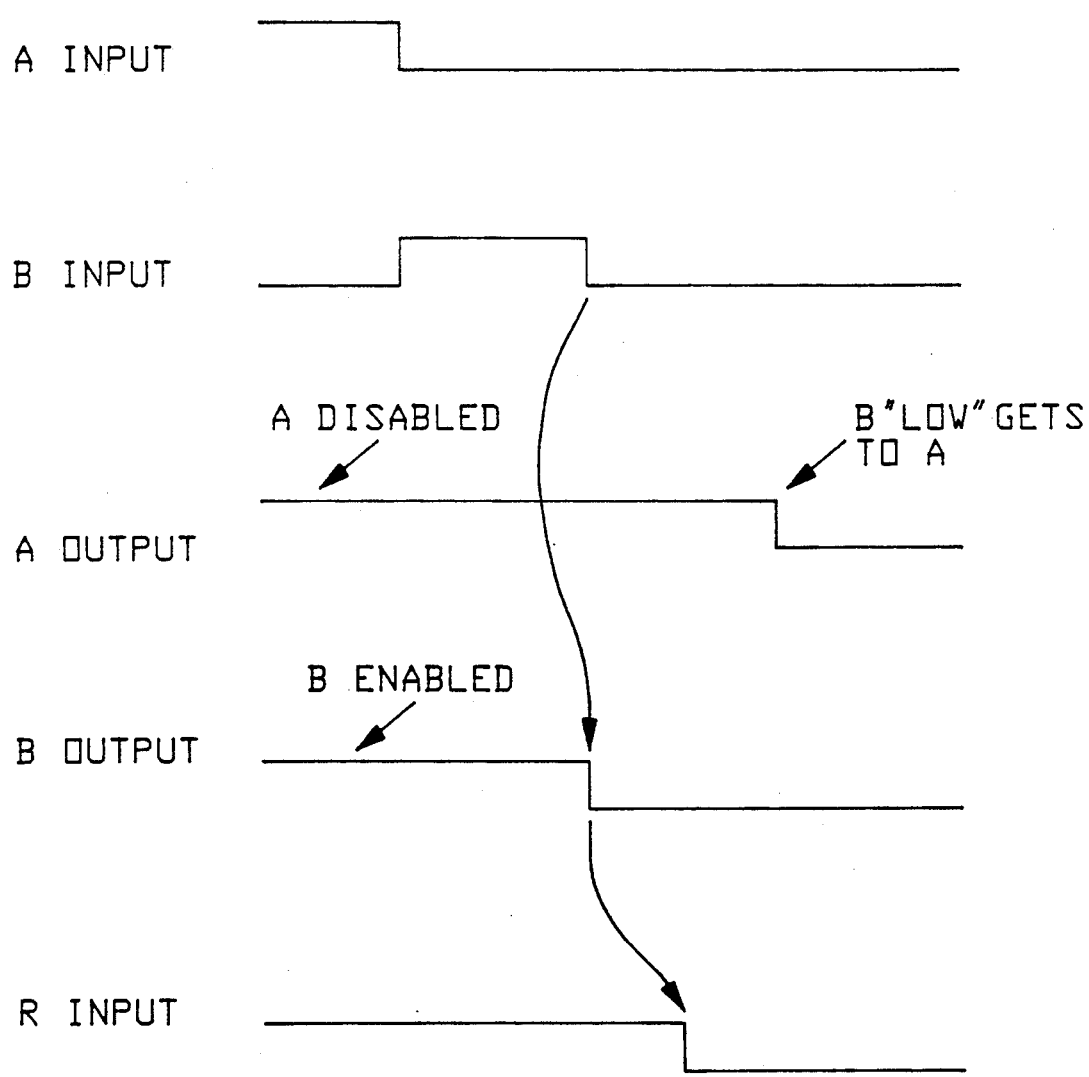
FIG. 11 is a timing diagram that shows the operation of the network of FIG. 7 when the circuitry of FIG. 9 is used to implement the present invention.

The net of FIG. 10 is implemented when the driver of FIG. 9 is substituted for the driver of FIG. 5 in the net shown in FIG. 6. As illustrated in FIG. 10, this substitution eliminates the current $I_2$ when the driver, such as driver B, is on and the other drivers, such as driver A, are off. This approach allows current flow through only the pull-down resistor of the single driver circuit which has control of the bus at the time. When this occurs there will be no DC steady state current in the net and no loss of signal between the active driver and the receiver(s) that are coupled to the net. The disable signal generator is constructed to supply disabling signals to the bases of the transistors $Q_3$ so that all but one $Q_3$ transistor will be turned on when drive signals are applied to the $Q_1$ drive transistors. The absence of DC current in the net will make it perform as a standard series terminated net with one driver and one load, which is known to work acceptably in many prior applications. The invention preferably is implemented in thin film modules where the resistance of the interconnect (the series resistance of the transmission lines from the drivers to the receivers) are made high enough to allow for series resistances of the driver (resistance $R_5$ of FIG. 9) to be approximately zero ohms. The resistivity of the interconnect lines are preferably in the range of 0.4 to 4 ohms per centimeter of length. This has the additional advantage of eliminating signal delays due to multiple reflections.

The present invention, therefore, a) allows for high-speed ECL multi-driver, bidirectional buses to be implemented with modules that employ high resistance interconnect technology, b) eliminates signal delays that would otherwise occur when one driver is on and the other drivers are off, and the driver that is on turns off while one of the other drivers turns on, and c) adds minimal complexity to the current ECL driver circuitry to achieve great performance benefits.

While a particular embodiment and a particular end transistor implementation has been disclosed, the applicability of the invention to other embodiments will be readily apparent from the above description to those skilled in the art.

I claim:

1. In an electronic network comprising a plurality of receivers, a plurality of drivers and a plurality of interconnect lines for coupling signals between said receivers and drivers, the improvement comprising,
   a) drivers which are constructed with emitter-coupled-logic bipolar technology, each of which drivers comprise
      1) an output transistor that has a base coupled to receive a drive signal, a collector coupled to a first voltage source and an emitter coupled to one of said interconnect lines,
      2) a pull-down transistor that has a base coupled to a reference voltage, its collector coupled to the emitter of said output transistor and an emitter, and
      3) a disable transistor that has a base coupled to receive a disable signal which drives said disable transistor into conduction when said disable signal is at an active level and an emitter coupled to the emitter of said pull-down transistor,
   b) a pull-down resistor coupled between said junction point and a second voltage source, and
   c) disable signal generator means for supplying said disable signals to said disable transistors in a manner such that all of said disable transistors except one will be turned on at a given time,
   wherein said disable transistors are biased so that when they are turned on they will supply sufficient current to the pull-down resistor to which they are coupled to maintain the pull-down transistor which is also coupled to said pull-down resistor in a substantially cut-off state.

2. In an electronic network as claimed in claim 1 the improvement wherein said interconnect lines have resistance of at least 0.4 ohms per centimeter of length.

* * * * *